(12) United States Patent
Kong et al.

(10) Patent No.: US 8,995,436 B2
(45) Date of Patent: Mar. 31, 2015

(54) METHOD AND APPARATUS FOR GENERATING GROUP SERVICE FLOW IN A MOBILE COMMUNICATION SYSTEM

(75) Inventors: Dong-Keon Kong, Suwon-si (KR); Hyun-Jeong Kang, Seoul (KR); Jung-Shin Park, Seoul (KR); Yeong-Moon Son, Yongin-si (KR); Nae-Hyun Lim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 689 days.

(21) Appl. No.: 13/175,753

(22) Filed: Jul. 1, 2011

(65) Prior Publication Data

US 2012/0002583 A1 Jan. 5, 2012

(30) Foreign Application Priority Data

Jul. 2, 2010 (KR) ........................ 10-2010-0064092

(51) Int. Cl.
*H04Q 11/00* (2006.01)
*H04W 92/04* (2009.01)
*H04W 72/12* (2009.01)
*H04W 76/02* (2009.01)

(52) U.S. Cl.
CPC .......... *H04W 92/045* (2013.01); *H04W 72/121* (2013.01); *H04W 76/021* (2013.01)
USPC ........................................................ 370/384

(58) Field of Classification Search
USPC ................................................. 370/310–349
See application file for complete search history.

(56) References Cited

U.S. PATENT DOCUMENTS

| | | | | |
|---|---|---|---|---|
| 7,522,570 | B2 * | 4/2009 | Kim et al. | 370/338 |
| 8,081,628 | B2 * | 12/2011 | Wu et al. | 370/390 |
| 8,270,331 | B2 * | 9/2012 | Kim et al. | 370/312 |
| 2010/0034128 | A1 * | 2/2010 | Yim et al. | 370/312 |
| 2010/0046410 | A1 * | 2/2010 | So et al. | 370/312 |
| 2010/0118756 | A1 * | 5/2010 | Kim et al. | 370/312 |
| 2010/0278091 | A1 * | 11/2010 | Sung et al. | 370/312 |

FOREIGN PATENT DOCUMENTS

WO   WO 2007/019672 A1 *   2/2007

* cited by examiner

*Primary Examiner* — Kwang B Yao
*Assistant Examiner* — Juvena Loo

(57) ABSTRACT

A method and apparatus generate a group service flow in a mobile communication system. An Advanced Mobile Station (AMS) in a mobile communication system transmits an AAI_REG-REQ message, which includes a group service request indicator indicating that it is required to generate the group service flow, to an ABS. The AMS receives an AAI_REG-RSP message and an AAI_DSA-REQ message, which includes at least one of a group service flow parameter for the group service flow, a multicasting Station Identifier (STID), a multicasting flow ID, a group service flow ID, and information indicating a use of the group service flow, from the ABS. The AMS then generates the group service flow in cooperation with the ABS in accordance with the AAI_DSA-REQ message.

28 Claims, 10 Drawing Sheets

METHOD AND APPARATUS FOR GENERATING GROUP SERVICE FLOW IN A MOBILE COMMUNICATION SYSTEM

CROSS-REFERENCE TO RELATED APPLICATION (S) AND CLAIM OF PRIORITY

The present application is related to and claims the priority under 35 U.S.C. §119(a) of an application entitled "Apparatus And Method For Generating Group Service Flow In A Mobile Communication System" filed in the Korean Industrial Property Office on Jul. 2, 2010 and assigned Serial No. 10-2010-0064092, the contents of which are hereby incorporated by reference.

TECHNICAL FIELD OF THE INVENTION

The present invention relates to an apparatus and a method for generating a group service flow in a mobile communication system.

BACKGROUND OF THE INVENTION

The Institute of Electrical and Electronics Engineers (IEEE) 802.16m communication system is a representative example of mobile communication systems, and a process of generating a service flow by an IEEE 802.16m communication system will now be described with reference to FIG. 1.

FIG. 1 schematically illustrates a process of generating a service flow by a typical IEEE 802.16m communication system.

In order to provide a service to an Advanced Mobile Station (AMS) in an IEEE 802.16m communication system, an initial signal transmission/reception procedure in the network layer, including acquisition of an Internet Protocol (IP) address, is necessary for an initial access procedure in a wireless network. Therefore, the initial access procedure in a wireless network includes a process of generating a service flow in order to transmit/receive messages for the initial signal transmission/reception procedure in the network layer.

Referring to FIG. 1, the IEEE 802.16m communication system includes a plurality of AMSs, which include AMS#1 111-1, AMS#2 111-2, and AMS#3 111-3, an Advanced Base Station (ABS) 115, an Access Service Network-Gateway (ASN-GW) 119, an Application Server (AS) 121, a Policy Charging Rules Function (PCRF) server 123, and an Authorization, Authentication, and Accounting (AAA) server 125. Each of AMS#1 111-1 to AMS#3 111-3 generates an individual transport connection and an individual service flow. Specifically, AMS#1 111-1 generates transport connection#1 113-1 and service flow#1 117-1, AMS#2 111-2 generates transport connection#2 113-2 and service flow#2 117-2, and AMS#3 111-3 generates transport connection#3 113-3 and service flow#3 117-3. Therefore, the ABS 115 is connected to the ASN-GW 119 by using a service flow generated for each AMS, and each of the AMSs is connected to the ABS 115 by using a transport connection mapped to a corresponding service flow.

In a state in which the AMSs have been connected with the ASN-GW by using the service flows and the transport connections, data is transmitted to the AMSs according to the process as described below.

First, when the AS 121 transmits data to AMS#1 111-1, the data is transmitted to AMS#1 111-1 through a path of the AS 121—the ASN-GW 119—service flow#1 117-1—the ABS 115—transport connection#1 113-1—AMS#1 111-1.

Second, when the AS 121 transmits data to AMS#2 111-2, the data is transmitted to AMS#2 111-2 through a path of the AS 121—the ASN-GW 119—service flow#2 117-2—the ABS 115—transport connection#2 113-2—AMS#2 111-2.

Third, when the AS 121 transmits data to AMS#3 111-3, the data is transmitted to AMS#3 111-3 through a path of the AS 121—the ASN-GW 119—service flow#3 117-3—the ABS 115 —transport connection#3 113-3—AMS#3 111-3.

Hereinafter, a process of generating a service flow by a typical IEEE 802.16m communication system will be described with reference to FIG. 2.

FIG. 2 is a signal flow diagram of a process for generating a service flow by a typical IEEE 802.16m communication system.

Referring to FIG. 2, an AMS 211 acquires downlink (DL) channel information, performs a Medium Access Control (MAC) synchronization, and then acquires uplink (UL) channel information, in cooperation with an ABS 213 (step 219). Thereafter, the AMS 211 and the ABS 213 perform initial ranging (step 221). Specifically, the AMS 211 transmits an Advanced Air Interface Ranging Request (AAI_RNG-REQ) message to the ABS 213. Upon receiving the AAI_RNG-REQ message from the AMS 211, the ABS 213 transmits an Advanced Air Interface Ranging Response (AAI_RNG-RSP) message, which is a response message to the AAI_RNG-REQ message, to the AMS 211.

After performing the initial ranging with the ABS 213 in the way described above, the AMS 211 transmits an Advanced Air Interface Subscriber Station Basic Capability Request (AAI_SBC-REQ) message to the ABS 213 (step 223). Upon receiving the AAI_SBC-REQ message from the AMS 211, the ABS 213 transmits an AMS Pre-Attachment request (AMS_PreAttachment_REQ) message to the ASN-GW 215 in order to notify the ASN-GW 215 that the AMS 211 has accessed the network (step 225). Upon receiving the AMS_PreAttachment_REQ message, the ASN-GW 215 transmits an AMS Pre-Attachment response (AMS_PreAttachment_RSP) message, which is a response to the AMS_PreAttachment_REQ message, to the ABS 213 (step 227). Upon receiving the AMS_PreAttachment_RSP message from the ASN-GW 215, the ABS 213 transmits an Advanced Air Interface Subscriber Station Basic Capability Response (AAI_SBC-RSP) message, which is a response message to the AAI_SBC-REQ message, to the AMS 211 (step 229). The AAI_SBC-RSP message includes information on authentication policy.

Furthermore, after transmitting the AAI_SBC-RSP message to the AMS 211, the ABS 213 transmits a Pre-Attachment acknowledgement (AMS_PreAttachment_ACK) message, which is a response message to the AMS_PreAttachment_RSP message, to the ASN-GW 215 (step 231).

Upon receiving the AMS_PreAttachment_ACK message from the ABS 213, the ASN-GW 215 performs, in cooperation with the AAA server 217, an Extensible Authentication Protocol (EAP) authentication procedure (step 233). After the EAP authentication procedure, the ASN-GW 215, the ABS 213, and the AMS 211 perform a key exchange procedure (step 235).

After the key exchange procedure, the AMS 211 transmits an Advanced Air Interface Registration Ranging Request (AAI_REG-REQ) message to the ABS 213 (step 237). Upon receiving the AAI_REG-REQ message from the AMS 211, the ABS 213 transmits an AMS Attachment Request (AMS_Attachment_REQ) message to the ASN-GW 215 (step 239). The AMS_Attachment_REQ message includes registration context and an identifier (ID) of the ABS 213.

Upon receiving the AMS_Attachment_REQ message, the ASN-GW 215 transmits an AMS Attachment response (AMS_Attachment_RSP) message, which is a response message to the AMS_Attachment_REQ message, to the ABS 213 (step 241).

Upon receiving the AMS_Attachment_RSP message, the ABS 213 transmits an Advanced Air Interface Registration Ranging Response (AAI_REG-RSP) message, which is a response message to the AAI_REG-REQ message, to the AMS 211 (step 243).

When registration of the AMS 211 is completed through steps 237 to 243 as described above, a procedure for generating a service flow is performed. That is, the ASN-GW 215 transmits a Path Registration Request (Path_REG_REQ) message to the ABS 213 (step 245). The Path_REG_REQ message includes Quality of Service (QoS) parameters for generation of a service flow.

Upon receiving the Path_REG_REQ message, the ABS 213 transmits an Advanced Air Interface Dynamic Service Addition Request (AAI_DSA-REQ) message to the AMS 211 (step 247). Upon receiving the AAI_DSA-REQ message, the AMS 211 transmits an Advanced Air Interface Dynamic Service Addition Response (AAI_DSA-RSP) message, which is a response message to the AAI_DSA-REQ message, to the ABS 213 (step 249). Upon receiving the AAI_DSA-RSP message, the ABS 213 transmits a Path Registration Response (Path_REG_RSP) message, which is a response message to the Path_REG_REQ message, to the ASN-GW 215 (step 251). Furthermore, the ABS 213 transmits an Advanced Air Interface Dynamic Service Addition Acknowledgement (AAI_DSA-ACK) message, which is a response message to the AAI_DSA-RSP message, to the AMS 211 (step 253).

Furthermore, the ASN-GW 215 transmits a Path Registration Acknowledgement (Path_REG_ACK) message, which is a response message to the Path_REG_RSP message, to the ABS 213 (step 255).

As described above, the IEEE 802.16m communication system independently generates and maintains a service flow for each AMS. For example, even when thousands of AMSs intermittently transmit a very small quantity of data, the IEEE 802.16m communication system independently generates and maintains service flows for the thousands of AMSs.

Such an independent generation and maintenance of service flows for the AMSs, which intermittently transmit a very small quantity of data, may cause unnecessary waste of resources, including memory resources and state management resources, in view of the network.

SUMMARY OF THE INVENTION

To address the above-discussed deficiencies of the prior art, it is a primary object to provide an apparatus and a method for generating a group service flow in a mobile communication system.

Furthermore, the present invention has been made in an effort to propose an apparatus and a method for generating a group service flow so as to enable the transmission of data using a multicast scheme in a mobile communication system.

In accordance with an aspect of the present invention, there is provided a method of generating a group service flow by an Advanced Mobile Station (AMS) in a mobile communication system. An Advanced Air Interface Registration Ranging Request (AAI_REG-REQ) message, which includes a group service request indicator indicating that the group service flow is to be generated, is transmitted to an Advanced Base Station (ABS). An Advanced Air Interface Registration Ranging Response (AAI_REG-RSP) message and an Advanced Air Interface Dynamic Service Addition Request (AAI_DSA-REQ) message, the AAI_DSA-REQ message including at least one of a group service flow parameter for the group service flow, a multicasting Station Identifier (STID), a multicasting flow ID, a group service flow ID, and information indicating a use of the group service flow, is received from the ABS. And in accordance with the AAI_DSA-REQ message, the group service flow is generated in cooperation with the ABS.

In accordance with another aspect of the present invention, there is provided a method of generating a group service flow by an AMS in a mobile communication system. An Advanced Air Interface Dynamic Service Addition Request (AAI_DSA-REQ) message, which includes at least one of a group service flow parameter, a multicasting Station Identifier (STID), a multicasting flow ID, a group service flow ID, and information indicating a use of the group service flow, is received from an Advanced Base Station (ABS) to update a service flow set between the ABS and the AMS into the group service flow. And in accordance with the AAI_DSA-REQ message, the service flow set for the AMS is changed to the group service flow.

In accordance with another aspect of the present invention, there is provided a method of generating a group service flow by an Advanced Base Station (ABS) in a mobile communication system. An Advanced Air Interface Registration Ranging Request (AAI_REG-REQ) message, which includes a group service request indicator indicating that the group service flow is to be generated, is received from an Advanced Mobile Station (AMS). An Advanced Air Interface Registration Ranging Response (AAI_REG-RSP) message and an Advanced Air Interface Dynamic Service Addition Request (AAI_DSA-REQ) message, the AAI_DSA-REQ message including at least one of a group service flow parameter for the group service flow, a multicasting Station Identifier (STID), a multicasting flow ID, a group service flow ID, and information indicating a use of the group service flow, is transmitted to the AMS. And in accordance with the AAI_DSA-REQ message, the group service flow is generated in cooperation with the AMS.

In accordance with another aspect of the present invention, there is provided a method of generating a group service flow by an ABS in a mobile communication system. An Advanced Air Interface Dynamic Service Addition Request (AAI_DSA-REQ) message, which includes at least one of a group service flow parameter, a multicasting Station Identifier (STID), a multicasting flow ID, a group service flow ID, and information indicating a use of the group service flow, is transmitted to an Advanced Mobile Station (AMS) to update a service flow set between the ABS and the AMS into the group service flow. And in accordance with the AAI_DSA-REQ message, the service flow set for the AMS is changed to the group service flow.

In accordance with another aspect of the present invention, there is provided a method of generating a group service flow by an Access Service Network-Gateway (ASN-GW) in a mobile communication system. A group profile for a group service is received from an Authorization, Authentication, and Accounting (AAA) server and stored during an initial network entry procedure. An Advanced Mobile Station (AMS) Attachment request (AMS_Attachment_REQ) message is received from an Advanced Base Station (ABS) providing a service to the AMS. And when the AMS_Attachment_REQ message includes a group service request indicator indicating that a group service flow is to be generated for the AMS, the group service flow is generated for the AMS, and a Path Registration Request (Path_REG_REQ) message including group service flow information and a group service indicator for the generated group service flow is transmitted to the ABS.

In accordance with another aspect of the present invention, there is provided a method of generating a group service flow by an Access Service Network-Gateway (ASN-GW) in a mobile communication system. A group profile for a group service is received from an Application Server (AS) and stored. It is determined at to whether the group profile includes a service flow of an Advanced Mobile Station (AMS). When the group profile does not include the service flow of the AMS, the group service flow for the AMS is generated, and a Path Registration Request (Path_REG_REQ) message including group service flow information and a group service indicator for the generated group service flow is transmitted to an Advanced Base Station (ABS) providing a service to the ABS. And when the group profile includes the service flow of the AMS, the service flow of the AMS is changed to the group service flow, and a Path Modification Request (Path_Modification_REQ) message, which includes the group service flow information and the group service indicator for the changed group service flow, is transmitted to the ABS.

In accordance with another aspect of the present invention, there is provided an Advanced Mobile Station (AMS) in a mobile communication system. The AMS includes a transmission unit, a reception unit, and a control unit. The transmission unit transmits an Advanced Air Interface Registration Ranging Request (AAI_REG-REQ) message, which includes a group service request indicator indicating that the group service flow is to be generated, to an Advanced Base Station (ABS). The reception unit receives an Advanced Air Interface Registration Ranging Response (AAI_REG-RSP) message and an Advanced Air Interface Dynamic Service Addition Request (AAI_DSA-REQ) message, the AAI_DSA-REQ message including at least one of a group service flow parameter for the group service flow, a multicasting Station Identifier (STID), a multicasting flow ID, a group service flow ID, and information indicating a use of the group service flow, from the ABS. And the control unit generates the group service flow in cooperation with the ABS in accordance with the AAI_DSA-REQ message.

In accordance with another aspect of the present invention, there is provided an Advanced Mobile Station (AMS) in a mobile communication system. The AMS includes a reception unit and a control unit. The reception unit receives an Advanced Air Interface Dynamic Service Addition Request (AAI_DSA-REQ) message, which includes at least one of a group service flow parameter, a multicasting Station Identifier (STID), a multicasting flow ID, a group service flow ID, and information indicating a use of the group service flow, from an Advanced Base Station (ABS) to update a service flow set between the ABS and the AMS into the group service flow. The control unit changes the service flow set for the AMS to the group service flow in accordance with the AAI_DSA-REQ message.

In accordance with another aspect of the present invention, there is provided an Advanced Base Station (ABS) in a mobile communication system. The ABS includes a reception unit, a transmission unit, and a control unit. The reception unit receives an Advanced Air Interface Registration Ranging Request (AAI_REG-REQ) message, which includes a group service request indicator indicating that the group service flow is to be generated, from an Advanced Mobile Station (AMS). The transmission unit transmits an Advanced Air Interface Registration Ranging Response (AAI_REG-RSP) message and an Advanced Air Interface Dynamic Service Addition Request (AAI_DSA-REQ) message, the AAI_DSA-REQ message including at least one of a group service flow parameter for the group service flow, a multicasting Station Identifier (STID), a multicasting flow ID, a group service flow ID, and information indicating a use of the group service flow, to the AMS. And the control unit generates the group service flow in cooperation with the AMS in accordance with the AAI_DSA-REQ message.

In accordance with another aspect of the present invention, there is provided an Advanced Base Station (ABS) in a mobile communication system. The ABS includes a transmission unit and a control unit. The transmission unit transmits an Advanced Air Interface Dynamic Service Addition Request (AAI_DSA-REQ) message, which includes at least one of a group service flow parameter, a multicasting Station Identifier (STID), a multicasting flow ID, a group service flow ID, and information indicating a use of the group service flow, to an Advanced Mobile Station (AMS) to update a service flow set between the ABS and the AMS into the group service flow. The control unit changes the service flow set for the AMS to the group service flow in accordance with the AAI_DSA-REQ message.

In accordance with another aspect of the present invention, there is provided an Access Service Network-Gateway (ASN-GW) in a mobile communication system. The ASN-GW includes a reception unit, a control unit, and a transmission unit. The reception unit receives an Advanced Mobile Station (AMS) Attachment request (AMS_Attachment_REQ) message from an Advanced Base Station (ABS) providing a service to an AMS. The control unit receives a group profile for a group service from an Authorization, Authentication, and Accounting (AAA) server, stores the group profile during an initial network entry procedure, and generates the group service flow for the AMS when the AMS_Attachment_REQ message includes a group service request indicator indicating that a group service flow is to be generated for the AMS. And the transmission unit transmits a Path Registration Request (Path_REG_REQ) message including group service flow information and a group service indicator for the generated group service flow to the ABS.

In accordance with yet another aspect of the present invention, there is provided an Access Service Network-Gateway (ASN-GW) in a mobile communication system. The ASN-GW includes a control unit and a transmission unit. The control unit receives a group profile for a group service from an Application Server (AS), stores the group profile, determines whether the group profile includes a service flow of an Advanced Mobile Station (AMS), generates the group service flow for the AMS when the group profile does not include the service flow of the AMS, and changes the service flow of the AMS to the group service flow when the group profile includes the service flow of the AMS. The transmission unit transmits a Path Registration Request (Path_REG_REQ) message including group service flow information and a group service indicator for the generated group service flow to an Advanced Base Station (ABS) providing a service to the AMS, and transmits a Path Modification Request (Path_Modification_REQ) message, which includes the group service flow information and the group service indicator for the changed group service flow, to the ABS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. In the following description, a detailed description of known functions and configurations incorporated herein will be omitted when it may obscure the subject matter of the present invention rather.

The present disclosure proposes an apparatus and a method for generating a group service flow in a mobile communication system. The following description of the present invention is based on an assumption that the mobile communication system is, for example, an IEEE 802.16m communication system. However, it goes without saying that other mobile communication systems, such as Long Term Evolution (LTE) communication system, can also employ the apparatus and method for generating a group service flow proposed by the present disclosure.

Figure 3:
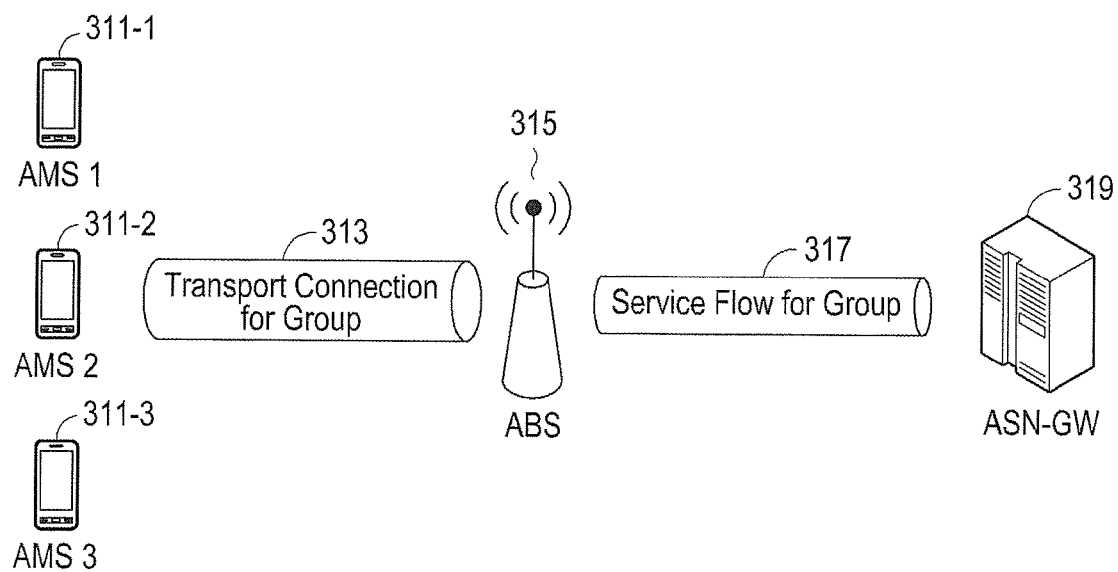
FIG. 3 schematically illustrates a process of generating a service flow by an IEEE 802.16m communication system according to an embodiment of the present invention.

FIG. 3 schematically illustrates a process of generating a service flow by an IEEE 802.16m communication system according to an embodiment of the present invention.

Referring to FIG. 3, the IEEE 802.16m communication system includes a plurality of AMSs, which include AMS#1 311-1, AMS#2 311-2, and AMS#3 311-3, an Advanced Base Station (ABS) 315, and an Access Service Network-Gateway (ASN-GW) 319.

AMS#1 311-1, AMS#2 311-2, and AMS#3 311-3 are end devices for users to access a network and use a service. The ABS 315 manages radio resources for network access of the AMSs including AMS#1 311-1, AMS#2 311-2, and AMS#3 311-3. The ASN-GW 319 performs a gateway function of a sub-net including a plurality of ABSs including the ABS 315. The ASN-GW 319 manages the service flow, connection, and mobility of the AMSs. The service flow is generated discriminatively for the uplink and the downlink.

Each of AMS#1 311-1, AMS#2 311-2, and AMS#3 311-3 generates a group transport connection 313 and a group service flow 317. That is a plurality of AMSs belonging to the same group can transmit or receive data to or from the ABS 315 according to a multicasting scheme by using a group transport connection and a group service flow generated for each group for group communication service, such as Machine To Machine communication (M2M) or Push To Talk (PTT).

Next, a process of generating a group service flow by an IEEE 802.16m communication system according to an embodiment of the present invention will be described with reference to FIG. 4.

Figure 4:
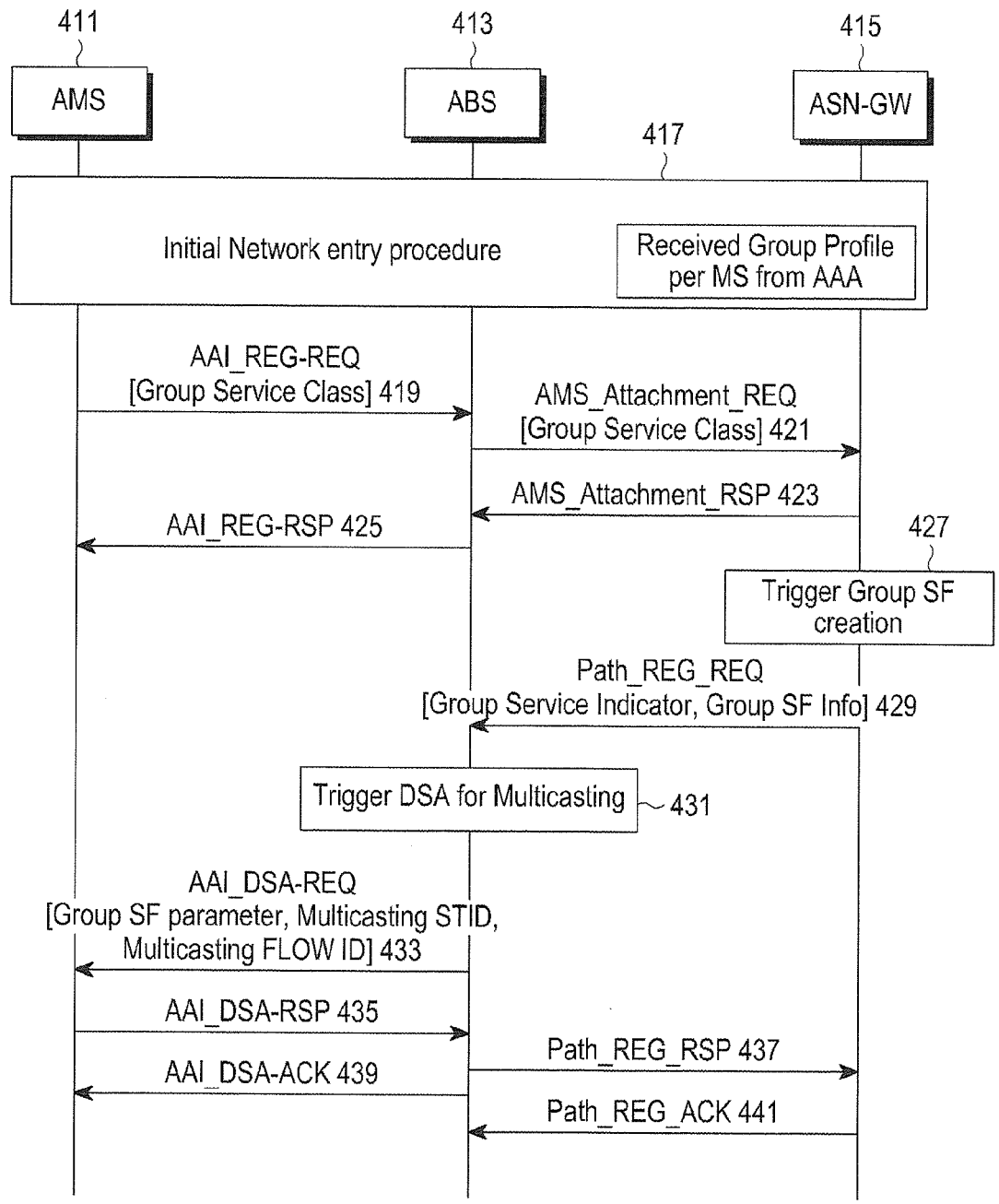
FIG. 4 illustrates a signal flow diagram of a process for generating a group service flow by an IEEE 802.16m communication system according to an embodiment of the present invention.

FIG. 4 is a signal flow diagram of a process for generating a group service flow by an IEEE 802.16m communication system according to an embodiment of the present invention.

Figure 1:
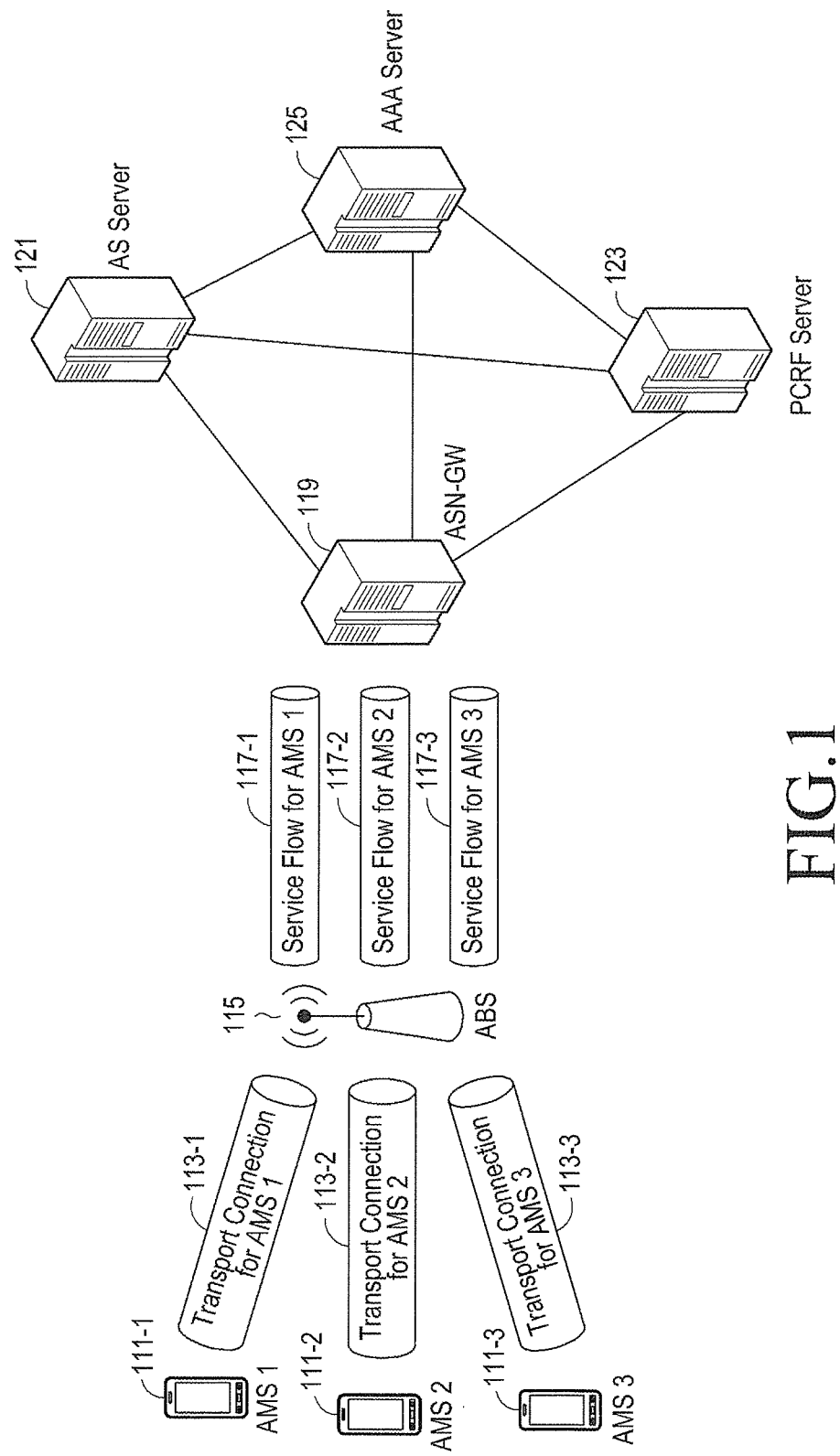
FIG. 1 schematically illustrates a process of generating a service flow by an IEEE 802.16m communication system.
Figure 2:
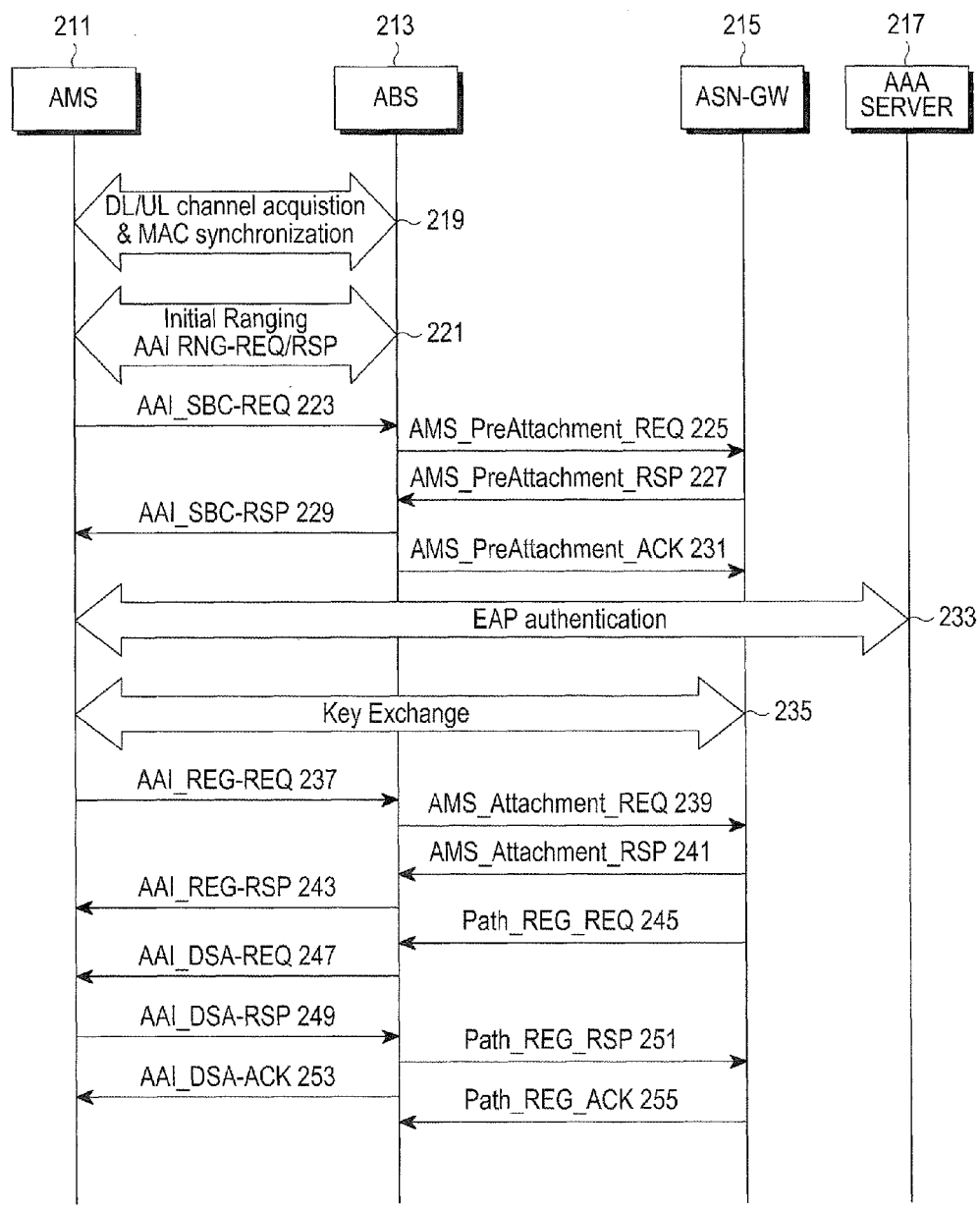
FIG. 2 illustrates a signal flow diagram of a process for generating a service flow by an IEEE 802.16m communication system.

The group service flow generating process shown in FIG. 4 corresponds to a process of generating a group service flow during the initial network entry procedure. The initial network entry procedure in step 417 is substantially similar to steps 219 to 235 in FIG. 2, so a detailed description thereof will be omitted here. Meanwhile, although an Authorization, Authentication, and Accounting (AAA) server is not separately shown in FIG. 4, it goes without saying that the AMS 411, the ABS 413, and the ASN-GW 415 perform an Extensible Authentication Protocol (EAP) authentication procedure together with the AAA server during the initial network entry procedure. However, the difference between the initial network entry procedure of step 417 and steps 219 to 235 in FIG. 2 is that the ASN-GW 415 has already received a group profile from the AAA server and is storing the group profile during the initial network entry procedure.

Here, the group profile includes group information, which includes a group identifier (ID) and a group service type (e.g. PTT service="01") and IDs of AMSs belonging to a group with the group ID. For example, if AMS#1, AMS#2, and AMS#3 belong to group A, the group profile includes a group ID of group A, and IDs of AMS#1, AMS#2, and AMS#3 belong to group A. In addition, the group profile may further include QoS information for a corresponding group and information on AMSs belonging to the group.

Meanwhile, the AMS 411 transmits an Advanced Air Interface Registration Ranging Request (AAI_REG-REQ) message to the ABS 413 (step 419). The AAI_REG-REQ message includes a group service class. The group service class refers to information indicating that a group service flow should be generated for a corresponding AMS, and the ASN-GW 415 determines whether to generate a group service flow for a corresponding AMS by using the group service class. Furthermore, the group service class may be transmitted to the ASN-GW 415 through an Application Server (AS) or an AAA server after the initial network access procedure of the AMS 411, in which case the AAI_REG-REQ message does not include the group service class.

Upon receiving the AAI_REG-REQ message from the AMS 411, the ABS 413 transmits an AMS Attachment request (AMS_Attachment_REQ) message to the ASN-GW 415 (step 421). The AMS_Attachment_REQ message includes a registration context, an ID of the ABS 413, and the group service class. Upon receiving the AMS_Attachment_REQ message, the ASN-GW 415 transmits an AMS Attachment response (AMS_Attachment_RSP) message, which is a response message to the AMS_Attachment_REQ message, to the ABS 413 (step 423). Upon receiving the AMS_Attachment_RSP message, the ABS 413 transmits an Advanced Air Interface Registration Ranging Response (AAI_REG-RSP) message, which is a response message to the AAI_REG-REQ message, to the AMS 411 (step 425).

When the registration of the AMS 411 has been completed (steps 419 through 425) as described above, a procedure for group service flow generation is triggered (step 427). That is, the ASN-GW 415 determines which group the AMS 411 belongs to, by using the ID of the AMS 411. If a group ID is not included in a group profile transferred from the AAA server, the ASN-GW 415 generates a group ID of the group including the AMS 411, and maps the group ID and the group service flow ID. The triggering of the procedure for group service flow generation may be performed by the AAA server, a Policy Charging Rules Function (PCRF) server (not shown), or the AS, as well as the ASN-GW 415.

In order to generate a group service flow, the ASN-GW 415 transmits a Path Registration Request (Path_REG_REQ) message to the ABS 413 (step 429). The Path_REG_REQ message includes a group service indicator and group service flow information for the creation of a group service flow, and the group service flow information includes a Quality of Service (QoS) parameter and a group service flow ID. The ABS 413 triggers a Dynamic Service Addition (DSA) procedure for enabling AMSs belonging to the corresponding group to transmit data using a multicasting scheme (step 431). At this time, the ABS 413 generates a multicasting flow ID mapped to the group service flow ID received from the ASN-GW 415. Otherwise, when a multicasting flow ID mapped to the group service flow ID already exists, the ABS 413 may use the existing multicasting flow ID. The ABS 413 transmits an Advanced Air Interface Dynamic Service Addition Request (A_DSA-REQ) message to the AMS 411 (step 433). The AAI_DSA-REQ message includes one or more combinations of a group service flow QoS parameter for a group service flow to be generated for the AMS 411, a multicasting Station Identifier (STID) used to receive group data, a multicasting flow ID, a group service flow ID, and information indicating the use (for example, notifying of PTT connection) of a group service flow. Furthermore, the multicasting STID may be used, in combination with the multicasting flow ID, to identify the group service flow, such as a PTT connection.

Upon receiving the AAI_DSA-REQ message, the AMS 411 transmits an Advanced Air Interface Dynamic Service Addition Response (AAI_DSA-RSP) message, which is a response message to the AAI_DSA-REQ message, to the ABS 413 (step 435). Upon receiving the AAI_DSA-RSP message, the ABS 413 transmits a Path Registration Response (Path_REG_RSP) message, which is a response message to the Path_REG_REQ message, to the ASN-GW 415 (step 437). Furthermore, the ABS 413 transmits an Advanced Air Interface Dynamic Service Addition Acknowledgement (AAI_DSA-ACK) message, which is a response message to the AAI_DSA-RSP message, to the AMS 411 (step 439).

The ASN-GW 415 transmits a Path Registration Acknowledgement (Path_REG_ACK) message, which is a response message to the Path_REG_RSP message, to the ABS 413 (step 441). Through the steps described above, a group service flow is generated in the AMS 411, the ABS 413, and the ASN-GW 415, and a data path is generated based on the group service flow. A process of transmitting and receiving group service data by using the generated group service flow is described later in detail.

Hereinafter, a process of generating a group service flow by an IEEE 802.16m communication system according to an embodiment of the present invention will be described with reference to FIG. 5.

Figure 5:
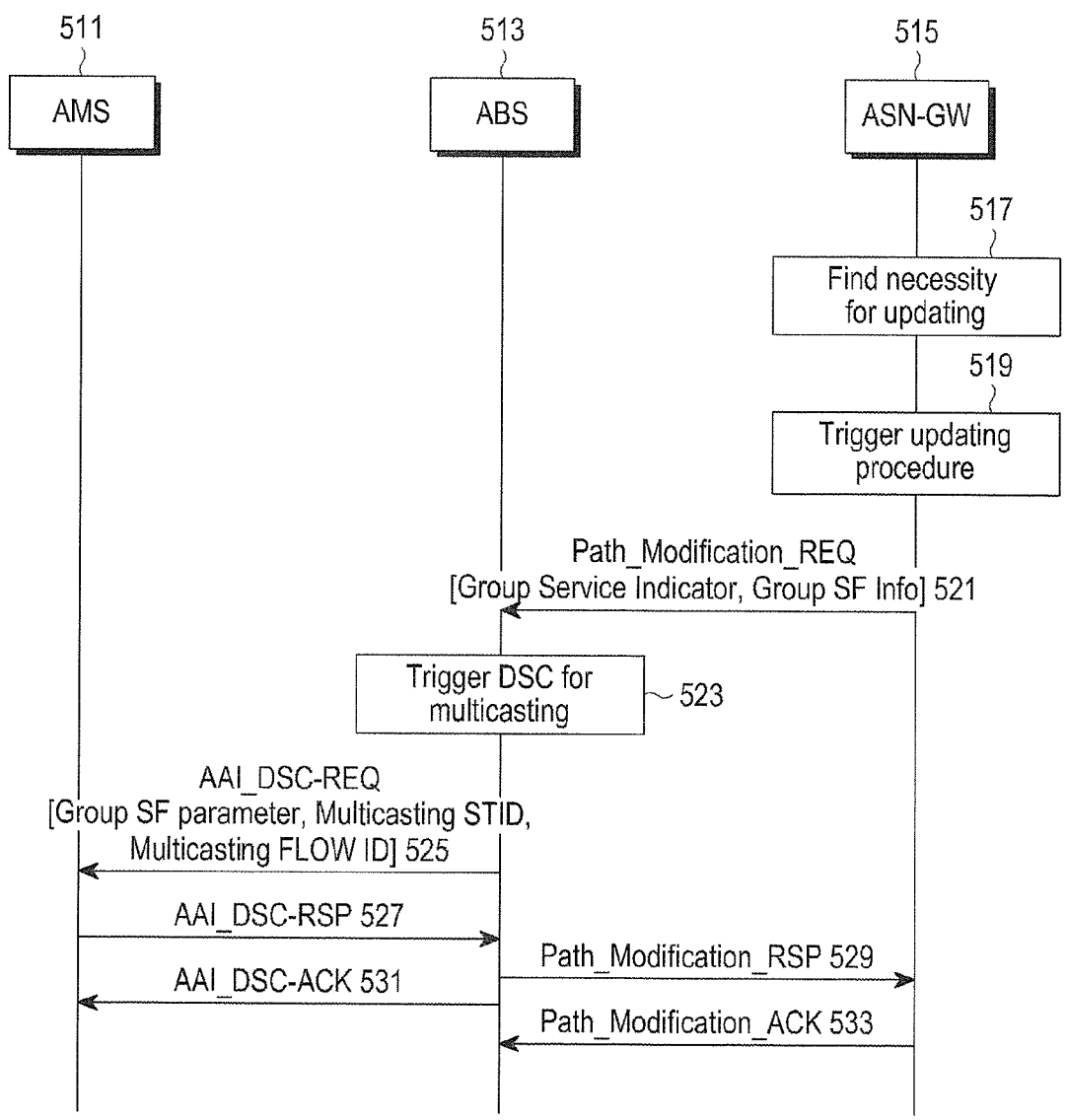
FIG. 5 illustrates a signal flow diagram of a process for generating a group service flow by an IEEE 802.16m communication system according to an embodiment of the present invention.

FIG. 5 is a signal flow diagram of a process for generating a group service flow by an IEEE 802.16m communication system according to an embodiment of the present invention.

The group service flow generating process shown in FIG. 5 corresponds to a process of generating a group service flow by updating independent service flows for AMSs to the group service flow.

Referring to FIG. 5, when receiving a group profile from a higher layer system, such as an AAA server (not shown), a PCRF server (not shown), or an AS (not shown), the ASN-GW 515 decides that the service flows set in the AMS 511 and the ABS 513 should be updated to a group service flow (step 517). Therefore, the ASN-GW 515 triggers a procedure for updating the service flows set in the AMS 511 and the ABS 513 to a group service flow (step 519). In this procedure, if the group profile received from the AAA server, PCRF server, or AS does not include a group ID, the ASN-GW 515 generates a group ID for the corresponding group and maps the generated group ID and the group service flow ID.

If the ASN-GW 515 has received a changed group profile from the AAA server, PCRF server, or AS in step 517, the ASN-GW 515 may dynamically support the group service flow of the AMSs. For example, during a PTT session, a PTT AS may collect information of AMSs requesting a group session and configure a group service flow for the AMSs. Specifically, if a particular AMS terminates a PTT session, the PTT AS may transmit an updated group profile to the ASN-GW 515 after deleting the AMS from the group profile. Otherwise, if a particular AMS is added to a PTT session, the PTT AS may transmit an updated group profile to the ASN-GW 515 after adding the AMS to the group profile.

The ASN-GW 515 transmits a Path Modification Request (Path_Modification_REQ) message to the ABS 513 (step 521). The Path_Modification_REQ message includes group service flow information and a group service indicator, wherein the group service flow information includes a QoS parameter and a group service flow ID. Based on the group service flow information, the ASN-GW 515 and the ABS 513 perform a procedure of changing already generated AMS-specific service flows to a group service flow. According to another embodiment, based on the group service flow information, the ASN-GW 515 and the ABS 513 may perform a procedure of newly generating a group service flow, separately from the already generated AMS-specific service flows. In order to newly generate a separate group service flow, it is necessary to perform substantially the same steps as steps 429 to 437 of FIG. 4.

Upon receiving the Path_Modification_REQ message, the ABS 513 triggers a Dynamic Service Change (DSC) procedure for enabling data transmission to the AMS 511 by using a multicasting scheme (step 523). At this time, the ABS 513 generates a multicasting flow ID mapped to the group service flow ID received from the ASN-GW 515.

The ABS 513 transmits an Advanced Air Interface Dynamic Service Change Request (AAI_DSC-REQ) message to the AMS 511 (step 525). The AAI_DSC-REQ message includes one or more combinations of a group service flow parameter, a multicasting flow ID, a group service flow ID, a multicasting STID, and information indicating the use (for example, notifying of PTT connection) of the changed group service flow. If the process shown in FIG. 5 is performed to update a previously set group service flow, the multicasting STID allocated by the ABS 513 may be changed in step 525. At this time, the changed multicasting STID may be included in the AAI_DSC-REQ message.

Upon receiving the AAI_DSC-REQ message, the AMS 511 transmits an Advanced Air Interface Dynamic Service Change Response (AAI_DSC-RSP) message, which is a response message to the AAI_DSC-REQ message, to the ABS 513 (step 527).

Upon receiving the AAI_DSC-RSP message, the ABS 513 transmits a Path Modification Response (Path_Modification_RSP) message, which is a response message to the Path_Modification_REQ message, to the ASN-GW 515 (step 529). Furthermore, the ABS 513 transmits an Advanced Air Interface Dynamic Service Change Acknowledgement (AAI_DSC-ACK) message, which is a response message to the AAI_DSC-RSP message, to the AMS 511 (step 531).

Meanwhile, upon receiving the Path_Modification_RSP message, the ASN-GW 515 transmits a Path Modification Acknowledgement (Path_Modification_ACK) message, which is a response message to the Path_Modification_RSP message, to the ABS 513 (step 533).

Through the steps described above, a group service flow is generated in the AMS 511, the ABS 513, and the ASN-GW 515, and a data path is generated based on the group service flow. A process of transmitting and receiving group service data by using the generated group service flow is described later in detail.

Figure 6:
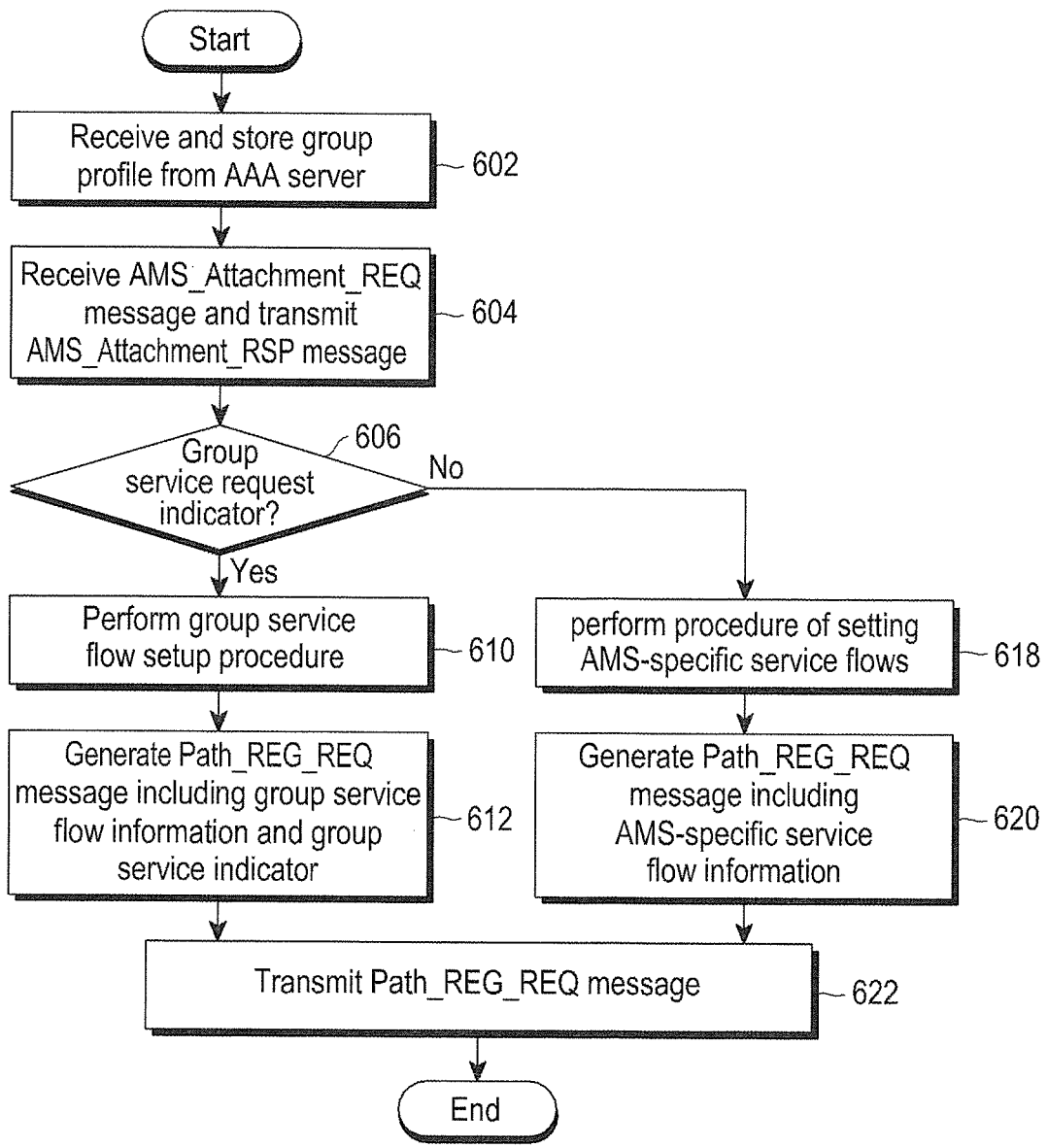
FIG. 6 illustrates a process of an ASN-GW according to an embodiment of the present invention.

FIG. 6 illustrates a process of an ASN-GW according to an embodiment of the present invention. The operation of the ASN-GW shown in FIG. 6 corresponds to an operation of the ASN-GW when the ASN-GW generates a group service flow during an initial network entry procedure according to the embodiment shown in FIG. 4.

Referring to FIG. 6, in block 602, the ASN-GW 415 receives and stores a group profile from an AAA server and stores the group profile in the initial network entry procedure. In block 604, the ASN-GW 415 receives an AMS_Attachment_REQ message from the ABS 413 and transmits an AMS_Attachment_RSP message as a response to the ABS 413. In block 606, the ASN-GW 415 determines whether a group service request indicator, which indicates whether it is necessary to generate a group service flow for the AMS 411, such as a group service class transmitted from the AMS 411 to the ABS 413, is included in the AMS_Attachment_REQ message.

If the group service class is included in the AMS_Attachment_REQ message, a group service flow setup procedure for generating a group service flow for the AMS 411 is performed in block 610. In block 612, the ASN-GW 415 generates a Path_REG_REQ message including group service flow information and a group service indicator. In block 622, the ASN-GW 415 transmits the generated Path_REG_REQ message to the ABS 413. In contrast, as a result of the determination in block 606, if the group service class is not included in the AMS_Attachment_REQ message, the ASN-GW 415 performs a procedure of setting AMS-specific service flows in block 618. In block 620, the ASN-GW 415 generates a Path_REG_REQ message including AMS-specific service flow information. In block 622, the ASN-GW 415 transmits the Path_REG_REQ message to the ABS 413.

Figure 7:
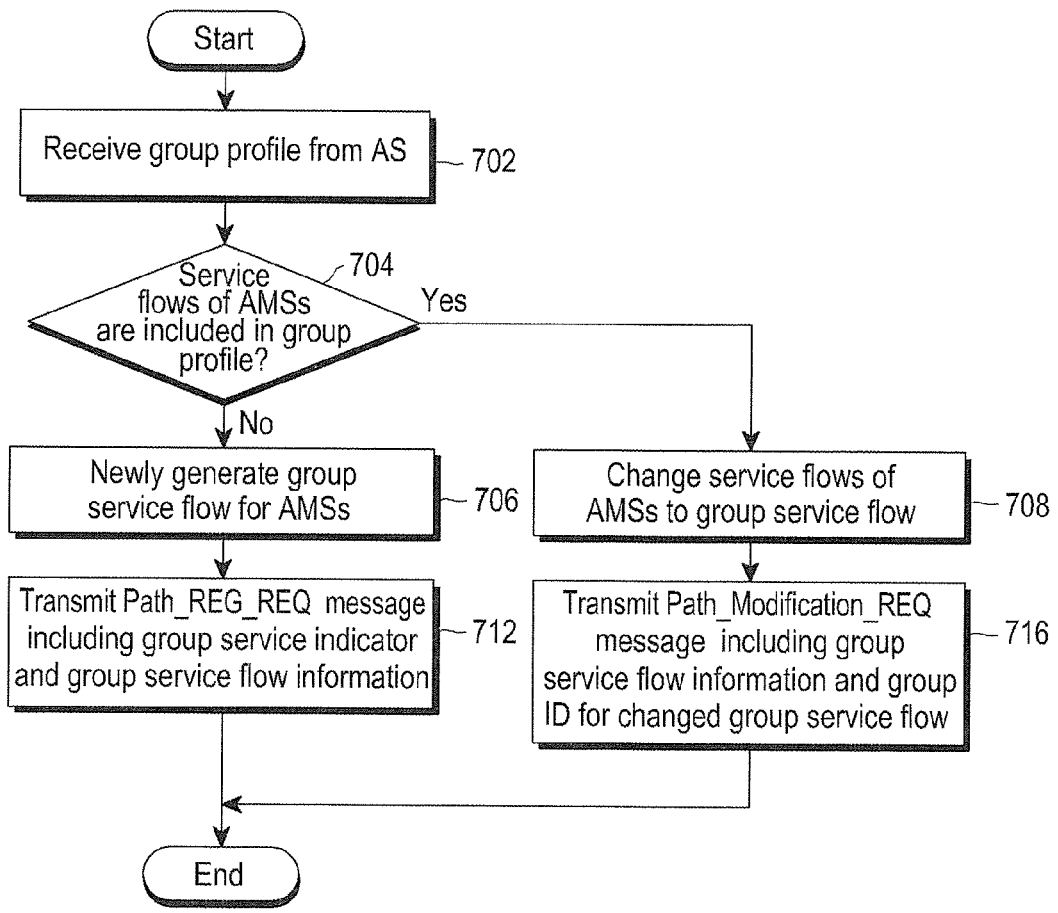
FIG. 7 illustrates a process of an ASN-GW according to an embodiment of the present invention.

FIG. 7 illustrates a process of an ASN-GW according to an embodiment of the present invention. The operation of the ASN-GW shown in FIG. 7 corresponds to an operation of the ASN-GW when the ASN-GW updates independent service flows for AMSs to a group service flow according to the embodiment shown in FIG. 5.

Referring to FIG. 7, in block 702, the ASN-GW 515 receives a group profile from the AS. The group profile includes QoS information for a corresponding group, a group service flow ID, and information of AMSs belonging to the corresponding group. In block 704, the ASN-GW 515 determines whether the group profile includes any service flow of the AMSs belonging to the group. If the group profile does not include any service flow of the AMSs, a group service flow setup procedure for newly generating a group service flow for the AMSs is performed in block 706. In block 712, the ASN-GW 515 transmits a Path_REG_REQ message including a group service indicator and group service flow information to the ABS 513.

In contrast, as a result of the determination in block 704, if the group profile includes any service flow of the AMSs, a procedure for changing the service flows of the AMSs to a group service flow is performed in block 708. In block 716, the ASN-GW 515 transmits a Path_Modification_REQ message, which includes group service flow information and a group ID for the changed group service flow, to the ABS 513.

The above description discusses a scheme of generating and changing a group service flow for downlink data. It is possible to assume that uplink data from an AMS is transmitted using a typical unicast service flow. However, according to another embodiment, a process of generating and changing a group service flow for the downlink can be similarly applied to the uplink as well.

Figure 8:
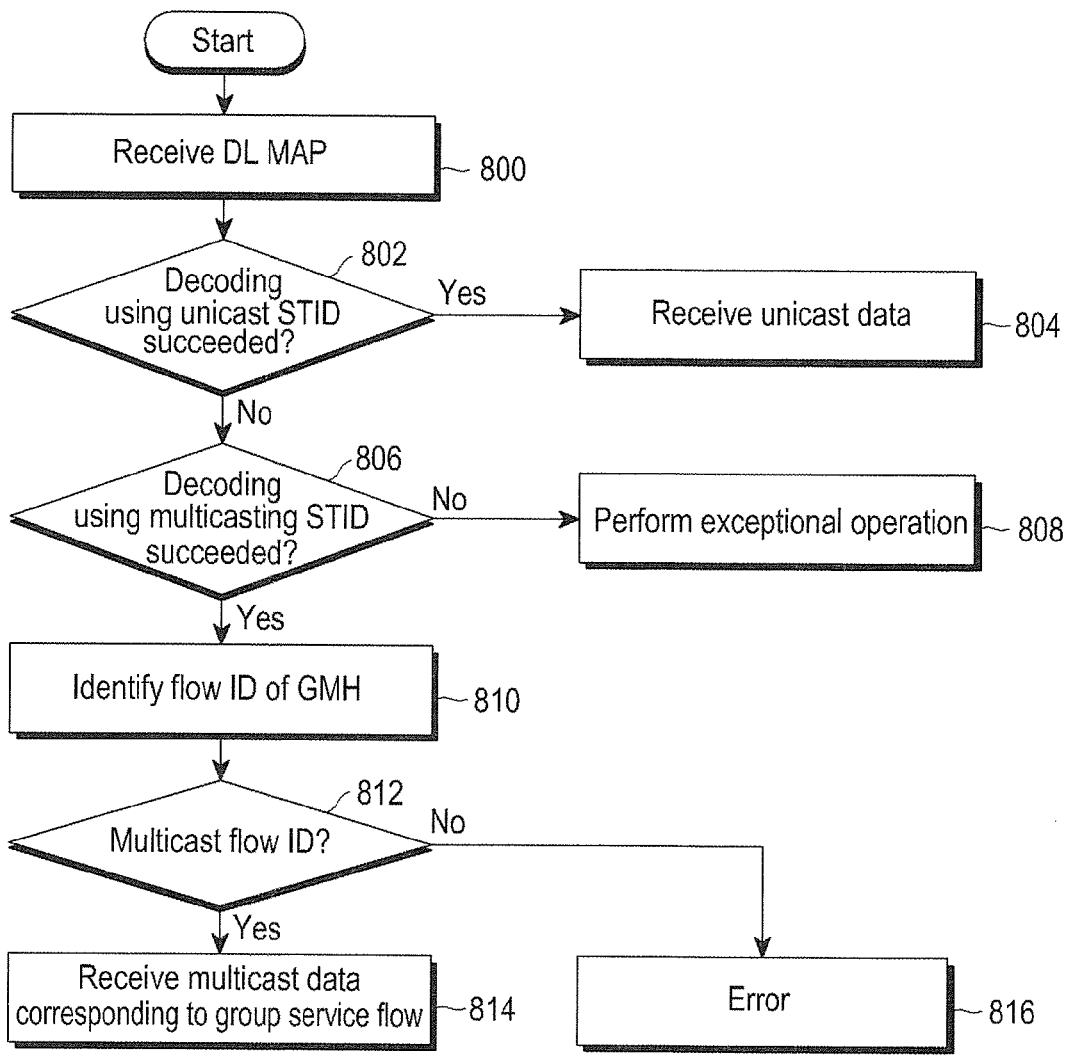
FIG. 8 illustrates a process of an AMS receiving group service data in an active mode according to an embodiment of the present invention.

FIG. 8 illustrates a process of an AMS receiving group service data in an active mode according to an embodiment of the present invention.

Referring to FIG. 8, an AMS in an active mode receives a downlink (DL) MAP message indicating allocation of downlink resource allocation at a predetermined location of a frame in block 800, and tries a blind decoding for the downlink MAP message by using a unicast STIP (AMS identifier) in block 802. When the blind decoding using the unicast STID in block 802 is successful, the AMS receives and processes the unicast data within the frame according to the downlink MAP message in block 804.

In contrast, when the blind decoding using the unicast STID in block 802 is not successful, the AMS tries a blind decoding by using a multicasting STID, which has been acquired in an initial network entry procedure according to step 433 of FIG. 4, or in a service flow change procedure according to step 525 of FIG. 5. When the blind decoding using the multicasting STID in block 806 is not successful, the AMS performs a predetermined exceptional operation in block 808. The predetermined exceptional operation may include, for example, an operation of trying a blind decoding by using another ID for downlink MAP decoding, which the AMS knows, other than the unicast STID or the multicasting STID, or an operation of determining that there is no downlink data corresponding to the AMS.

In contrast, when the blind decoding using the multicasting STID in block 806 is successful, the AMS receives a Generic Medium Access Control (MAC) Header (GMH) of downlink data within the frame according to the downlink MAP message and identifies a flow ID included in the GMH (block 810). In block 812, the AMS determines whether the flow ID corresponds to a multicasting STID, which has been acquired in an initial network entry procedure according to step 433 of FIG. 4 or in a service flow change procedure according to step 525 of FIG. 5. As a result of the determination in block 812, when the flow ID corresponds to the multicasting STID, the AMS decides that the downlink data is multicast data corresponding to the group service flow generated in the process of FIG. 4 and receives and processes the downlink data based on the decision (block 814). As a result of the determination in block 812, when the flow ID does not correspond to the multicasting STID, the AMS detects an error (block 816).

Figure 9:
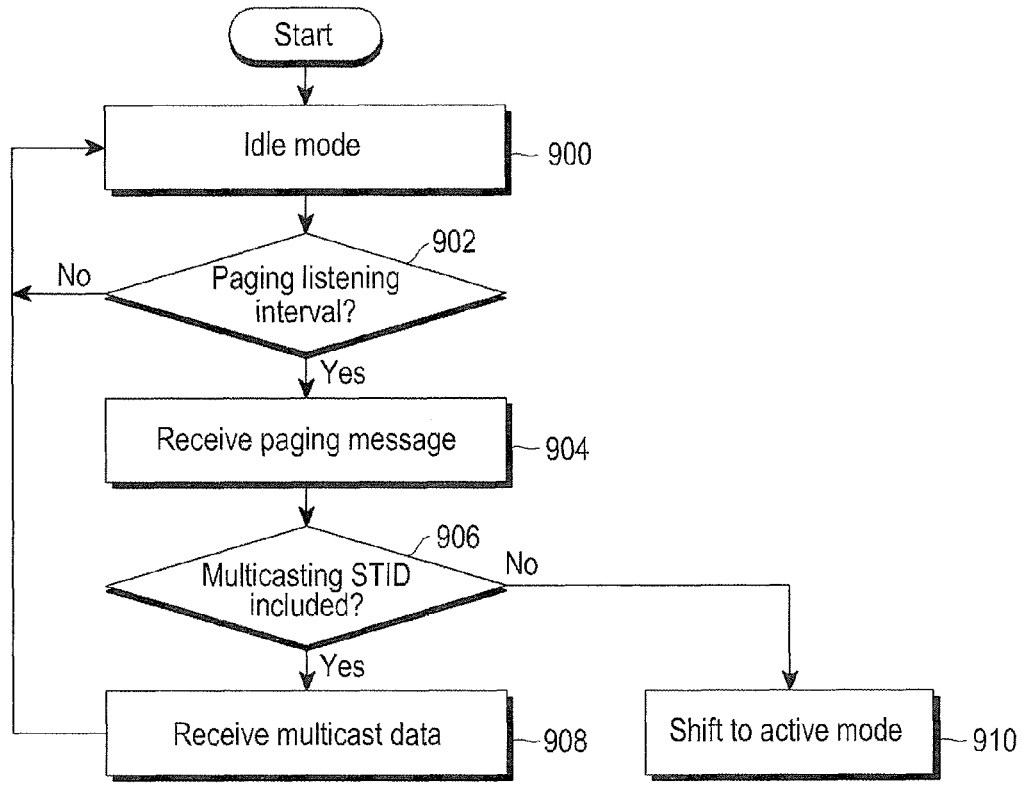
FIG. 9 illustrates a process of an AMS receiving group service data in an idle mode according to an embodiment of the present invention.

FIG. 9 illustrates a process of an AMS receiving group service data in an idle mode according to an embodiment of the present invention.

Referring to FIG. 9, the AMS stays in a paging non-listening interval of an idle mode in block 900, and determines whether a paging listening interval has begun in block 902. As a result of the determination in block 902, when the paging listening interval has not begun, the AMS returns to block 900. In contrast, when the paging listening interval has begun, the AMS proceeds to block 904 and receives a paging message. In block 906, the AMS determines whether the paging message includes a multicasting STID, which has been acquired in step 433 of FIG. 4 or in step 525 of FIG. 5, or a multicasting STID to be used in the idle mode. The multicasting STID to be used in the idle mode is provided when the AMS shifts to the idle mode.

As a result of the determination in block 906, when the paging message includes the multicasting STID acquired in step 433 of FIG. 4 or in step 525 of FIG. 5 or the multicasting STID to be used in the idle mode, the AMS receives multicast data during the listening interval in block 908. For example, the operation of the AMS receiving multicast data in block 908 is substantially similar to the operation of receiving multicast data as shown in FIG. 8. When the receiving of the multicast data has completed, the AMS shifts to the non-listening interval of the idle mode and returns to block 900.

In contrast, as a result of the determination in block 906, when the paging message includes neither the multicasting STID acquired in step 433 of FIG. 4 or in step 525 of FIG. 5 nor the multicasting STID to be used in the idle mode, the AMS shifts to an active mode and receives unicast data.

Figure 10:
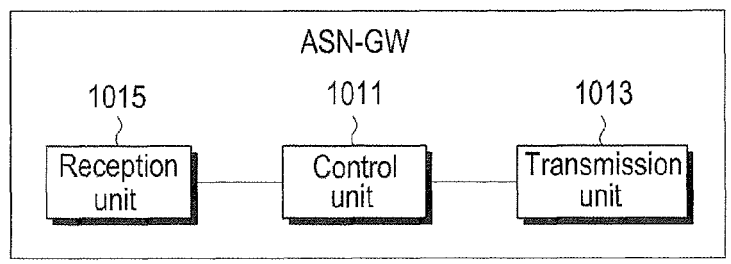
FIG. 10 is a block diagram of an internal structure of an ASN-GW in an IEEE 802.16m communication system according to an embodiment of the present invention.

FIG. 10 is a block diagram of an internal structure of an ASN-GW in an IEEE 802.16m communication system according to an embodiment of the present invention.

Referring to FIG. 10, the ASN-GW includes a control unit 1011, a transmission unit 1013, and a reception unit 1015.

The control unit 1011 controls the general operation of the ASN-GW for execution of an operation corresponding to the process of generating a group service flow proposed by an embodiment of the present invention. Here, the operation corresponding to the process of generating a group service flow performed by the ASN-GW is substantially the same as the above description, so a detailed description thereof is omitted here. Furthermore, the control unit 1011 may include a storage unit for storing various data and messages. It goes without saying that there may be a storage unit that is separate from the control unit 1011.

The transmission unit 1013 transmits various data and messages necessary for the operation corresponding to the process of generating a group service flow performed by the ASN-GW under the control of the control unit 1011. The data and messages transmitted by the transmission unit 1013 are substantially the same as the above description, so a detailed description thereof is omitted here.

The reception unit 1015 receives various data and messages necessary for the operation corresponding to the process of generating a group service flow performed by the ASN-GW under the control of the control unit 1011. The data and messages received by the reception unit 1015 are substantially the same as the above description, so a detailed description thereof is omitted here.

Although the control unit 1011, the transmission unit 1013, and the reception unit 1015 are shown as separate units in FIG. 10, it goes without saying that the control unit 1011, the transmission unit 1013, and the reception unit 1015 maybe implemented as a single integrated unit.

Figure 11:
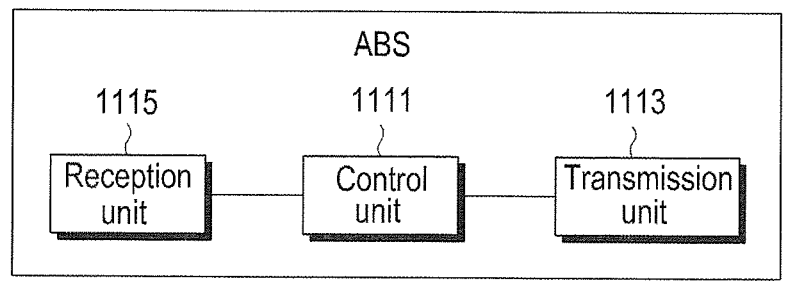
FIG. 11 is a block diagram of an internal structure of an ABS in an IEEE 802.16m communication system according to an embodiment of the present invention.

FIG. 11 is a block diagram of an internal structure of an ABS in an IEEE 802.16m communication system according to an embodiment of the present invention.

Referring to FIG. 11, the ABS includes a control unit 1111, a transmission unit 1113, and a reception unit 1115.

The control unit 1111 controls the general operation of the ABS for execution of an operation corresponding to the process of generating a group service flow proposed by an embodiment of the present invention. Here, the operation corresponding to the process of generating a group service flow performed by the ABS is substantially the same as the above description, so a detailed description thereof is omitted here. Furthermore, the control unit 1111 may include a storage unit for storing various data and messages. It goes without saying that there may be a storage unit that is separate from the control unit 1111.

The transmission unit 1113 transmits various data and messages necessary for the operation corresponding to the process of generating a group service flow performed by the ABS under the control of the control unit 1111. The data and messages transmitted by the transmission unit 1113 are substantially the same as the above description, so a detailed description thereof is omitted here.

The reception unit 1115 receives various data and messages necessary for the operation corresponding to the process of generating a group service flow performed by the ABS under the control of the control unit 1111. The data and messages received by the reception unit 1115 are substantially the same as the above description, so a detailed description thereof is omitted here.

Although the control unit 1111, the transmission unit 1113, and the reception unit 1115 are shown as separate units in FIG. 11, it goes without saying that the control unit 1111, the transmission unit 1113, and the reception unit 1115 may be implemented as a single integrated unit.

Figure 12:
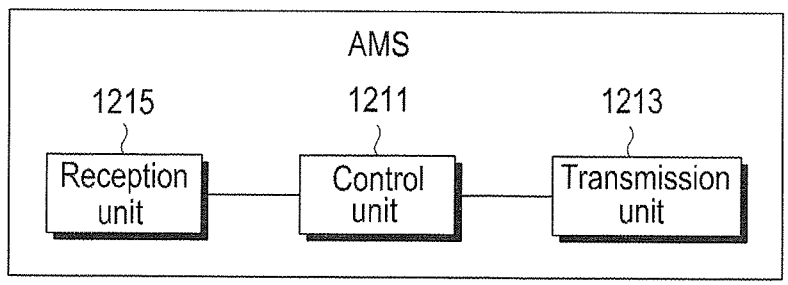
FIG. 12 is a block diagram of an internal structure of an AMS in an IEEE 802.16m communication system according to an embodiment of the present invention.

FIG. 12 is a block diagram of an internal structure of an AMS in an IEEE 802.16m communication system according to an embodiment of the present invention.

Referring to FIG. 12, the AMS includes a control unit 1211, a transmission unit 1213, and a reception unit 1215.

The control unit 1211 controls the general operation of the AMS for execution of an operation corresponding to the process of generating a group service flow proposed by an embodiment of the present invention. Here, the operation corresponding to the process of generating a group service flow performed by the AMS is substantially the same as the above description, so a detailed description thereof is omitted here. Furthermore, the control unit 1211 may include a storage unit for storing various data and messages. It goes without saying that there may be a storage unit may be separate from the control unit 1211.

The transmission unit 1213 transmits various data and messages necessary for the operation corresponding to the process of generating a group service flow performed by the AMS under the control of the control unit 1211. The data and messages transmitted by the transmission unit 1213 are substantially the same as the above description, so a detailed description thereof is omitted here.

The reception unit 1215 receives various data and messages necessary for the operation corresponding to the process of generating a group service flow performed by the AMS under the control of the control unit 1211. The data and messages received by the reception unit 1215 are substantially the same as the above description, so a detailed description thereof is omitted here.

Although the control unit 1211, the transmission unit 1213, and the reception unit 1215 are shown as separate units in FIG. 12, it goes without saying that the control unit 1211, the transmission unit 1213, and the reception unit 1215 may be implemented as a single integrated unit.

The present invention enables the generation of a group service flow in a mobile communication system, so as to minimize memory resources and state management resources required for generating and maintaining individual service flows, thereby increasing the efficiency in use of the resources.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of generating a group service flow by a mobile station (MS) in a mobile communication system, the method comprising:
    transmitting a registration ranging request (REG-REQ) message, the REG-REQ message including a group service request indicator indicating that the group service flow set between a base station (BS) and a group including the MS and at least one other MS is to be generated, to the BS;
    receiving a registration ranging response (REG-RSP) message and a dynamic service addition request (DSA-REQ) message, the DSA-REQ message including information related to the group including at least one of a group service flow parameter, a multicasting station identifier (STID), a multicasting flow ID, a group service flow ID, and information indicating a use of the group service flow, from the BS; and
    generating the group service flow in cooperation with the BS based on the DSA-REQ message.

2. The method of claim 1, wherein the multicasting STID indicates an identifier of the group.

3. The method of claim 1, further comprising:
    receiving a downlink map message from the BS;
    performing a blind decoding for the downlink map message based on a unicast identifier of the MS;
    if the blind decoding using the unicast identifier has failed, performing the blind decoding based on the multicasting STID;
    if the blind decoding using the multicasting STID has succeeded, receiving a generic medium access control (MAC) header (GMH) of downlink data based on the downlink map message and determining whether a flow ID included in the GMH is substantially identical to the multicasting flow ID; and
    if the flow ID included in the GMH is substantially identical to the multicasting flow ID, processing the downlink data as multicast data related to the group service flow.

4. The method of claim 1, further comprising:
    receiving a paging message in a paging listening interval of an idle mode;
    determining whether the paging message includes at least one of the multicasting STID received in the DSA-REQ and another multicasting STID to be used in the idle mode; and
    if the paging message includes at least one of the multicasting STID received in the DSA-REQ and the another multicasting STID to be used in the idle mode, shifting to an active mode and receiving the multicast data.

5. A method of generating a group service flow by a mobile station (MS) in a mobile communication system, the method comprising:
    receiving a dynamic service addition request (DSA-REQ) message, which includes information related to the group including at least one of a group service flow parameter, a multicasting station identifier (STID), a multicasting flow ID, a group service flow ID, and information indicating a use of the group service flow, from a base station (BS) to update a service flow set between the BS and the MS into the group service flow set between the BS and a group including the MS and at least one other MS; and
    changing the service flow set for the one MS to the group service flow set for at least two MSs based on the DSA-REQ message.

6. The method of claim 5, wherein the multicasting STID indicates an identifier of the group.

7. The method of claim 5, further comprising:
    receiving a downlink map message from the BS;
    performing a blind decoding for the downlink map message based on a unicast identifier of the MS;
    if the blind decoding using the unicast identifier has failed, performing a blind decoding based on the multicasting STID;
    if the blind decoding using the multicasting STID has succeeded, receiving a generic medium access control (MAC) header (GMH) of downlink data based on the downlink map message and determining whether a flow ID included in the GMH is substantially identical to the multicasting flow ID; and
    if the flow ID included in the GMH is substantially identical to the multicasting flow ID, processing the downlink data as multicast data related to the group service flow.

8. The method of claim 5, further comprising:
    receiving a paging message in a paging listening interval of an idle mode;

determining whether the paging message includes at least one of the multicasting STID included in the DSA-REQ message and another multicasting STID to be used in the idle mode; and if the paging message includes at least one of the multicasting STID included in the DSA-REQ message and the other multicasting STID to be used in the idle mode, shifting to an active mode and receiving multicast data.

9. A method of generating a group service flow by a base station (BS) in a mobile communication system, the method comprising:

receiving a registration ranging request (REG-REQ) message, which includes a group service request indicator indicating that the group service flow set between the BS and a group including at least two mobile stations (MSs) is to be generated, from an MS of the at least two MSs;

transmitting a registration ranging response (REG-RSP) message and a dynamic service addition request (DSA-REQ) message, the DSA-REQ message including information related to the group including at least one of a group service flow parameter, a multicasting station identifier (STID), a multicasting flow ID, a group service flow ID, and information indicating a use of the group service flow, to the MS; and generating the group service flow in cooperation with the MS based on the DSA-REQ message.

10. The method of claim 9, wherein the multicasting STID indicates an identifier of the group.

11. A method of generating a group service flow by a base station (BS) in a mobile communication system, the method comprising:

transmitting a dynamic service addition request (DSA-REQ) message, the DSA-REQ message including information related to a group including at least one of a group service flow parameter, a multicasting station identifier (STID), a multicasting flow ID, a group service flow ID, and information indicating a use of the group service flow, to a mobile station (MS) to update a service flow set between the BS and the MS into the group service flow set between the BS and the group including the MS and at least one other MS; and changing the service flow set for the one MS to the group service flow set for at least two MSs based on the DSA-REQ message.

12. The method of claim 11, wherein the multicasting STID indicates an identifier of the group.

13. A method of generating a group service flow by an access service network gateway (ASN-GW) in a mobile communication system, the method comprising:

receiving a group profile for a group service from an authorization, authentication, and accounting (AAA) server and storing the group profile during an initial network entry procedure;

receiving a mobile station (MS) attachment request (MS_Attachment_REQ) message from a base station (BS) for providing a service to an MS; and when the MS_Attachment_REQ message includes a group service request indicator indicating that a group service flow for the MS is to be generated, generating the group service flow for the MS and transmitting a Path Registration Request (Path_REG_REQ) message including group service flow information and a group service indicator for the generated group service flow to the BS.

14. A method of generating a group service flow by an access service network-gateway (ASN-GW) in a mobile communication system, the method comprising:

receiving a group profile for a group service from an application server (AS) and storing the group profile;

determining whether the group profile includes a service flow of a mobile station (MS);

when the group profile does not include the service flow of the MS, generating the group service flow for the MS and transmitting a path registration request (Path_REG_REQ) message including group service flow information and a group service indicator for the generated group service flow to a base station (BS) providing a service to the MS; and when the group profile includes the service flow of the MS, changing the service flow of the MS to the group service flow and transmitting a path modification request (Path_Modification_REQ) message, which includes the group service flow information and the group service indicator for the changed group service flow, to the BS.

15. A mobile station (MS) in a mobile communication system, the MS comprising:

a transmission unit configured to transmit a registration ranging request (REG-REQ) message, the REG-REQ message including a group service request indicator indicating that the group service flow set between a base station (BS) and a group including the MS and at least one other MS is to be generated, to the BS;

a reception unit configured to receive a registration ranging response (REG-RSP) message and a dynamic service addition request (DSA-REQ) message, the DSA-REQ message including information related to the group including at least one of a group service flow parameter for the group service flow, a multicasting station identifier (STID), a multicasting flow ID, a group service flow ID, and information indicating a use of the group service flow, from the BS; and a control unit configured to generate the group service flow in cooperation with the BS based on the DSA-REQ message.

16. The MS of claim 15, wherein the multicasting STID indicates an identifier of the group.

17. The MS of claim 15, wherein:

the reception unit is further configured to receive a downlink map message from the BS, receive a generic medium access control (MAC) header (GMH) of downlink data based on the downlink map message if a blind decoding based on the multicasting STID has succeeded, determine whether a flow ID included in the GMH is substantially identical to the multicasting flow ID, and process the downlink data as multicast data related to the group service flow if the flow ID included in the GMH is substantially identical to the multicasting flow ID; and the control unit is further configured to perform the blind decoding for the downlink map message based on a unicast identifier of the MS, and perform the blind decoding based on the multicasting STID if the blind decoding using the unicast identifier has failed.

18. The MS of claim 15, wherein:

the reception unit is further configured to receive a paging message in a paging listening interval of an idle mode, and shift to an active mode and receive multicast data if the paging message includes at least one of the multicasting STID received in the DSA-REQ and another multicasting STID to be used in the idle mode; and the control unit is further configured to determine whether the paging message includes at least one of the multicasting STID received in the DSA-REQ and the other multicasting STID to be used in the idle mode.

19. A mobile station (MS) in a mobile communication system, the MS comprising:
- a reception unit configured to receive a dynamic service addition request (DSA-REQ) message, which includes information related to a group including at least one of a group service flow parameter, a multicasting station identifier (STID), a multicasting flow ID, a group service flow ID, and information indicating a use of the group service flow, from a base station (BS) to update a service flow set between the BS and the MS into the group service flow set between the BS and the group including the MS and at least one other MS; and
- a control unit configured to change the service flow set for the one MS to the group service flow set for at least two MSs based on the DSA-REQ message.

20. The MS of claim 19, wherein the multicasting STID indicates an identifier of the group.

21. The MS of claim 19, wherein:
- the reception unit is further configured to receive a downlink map message from the BS, receive a generic medium access control (MAC) header (GMH) of downlink data based on the downlink map message if a blind decoding based on the multicasting STID has succeeded; and
- the control unit is further configured to perform the blind decoding for the downlink map message based on a unicast identifier of the MS, and perform the blind decoding based on the multicasting STID if the blind decoding using the unicast identifier has failed, determine whether a flow ID included in the GMH is substantially identical to the multicasting flow ID, and process the downlink data as multicast data related to the group service flow if the flow ID included in the GMH is substantially identical to the multicasting flow ID.

22. The MS of claim 19, wherein:
- the reception unit is further configured to receive a paging message in a paging listening interval of an idle mode, and receive multicast data; and
- the control unit is further configured to determine whether the paging message includes at least one of the multicasting STID included in the DSA-REQ message and another multicasting STID to be used in the idle mode, and shift to an active mode if the paging message includes at least one of the multicasting STID included in the DSA-REQ message and the another multicasting STID to be used in the idle mode.

23. A base station (BS) in a mobile communication system, the BS comprising:
- a reception unit configured to receive a registration ranging request (REG-REQ) message, which includes a group service request indicator indicating that the group service flow set between the BS and a group including at least two mobile stations (MSs) is to be generated, from an MS of the at least two MSs;
- a transmission unit configured to transmit a registration ranging response (REG-RSP) message and a dynamic service addition request (DSA-REQ) message, the DSA-REQ message including information related to the group including at least one of a group service flow parameter for the group service flow, a multicasting station identifier (STID), a multicasting flow ID, a group service flow ID, and information indicating a use of the group service flow, to the MS; and
- a control unit configured to generate the group service flow in cooperation with the MS based on the DSA-REQ message.

24. The BS of claim 23, wherein the multicasting STID indicates an identifier of the group.

25. A base station (BS) in a mobile communication system, the BS comprising:
- a transmission unit configured to transmit a dynamic service addition request (DSA-REQ) message, the DSA-REQ message including information related to a group including at least one of a group service flow parameter, a multicasting station identifier (STID), a multicasting flow ID, a group service flow ID, and information indicating a use of the group service flow, to a mobile station (MS) to update a service flow set between the BS and the MS into the group service flow set between the BS and the group including the MS and at least one other MS; and
- a control unit configured to change the service flow set for the one MS to the group service flow set for at least two MSs based on the DSA-REQ message.

26. The BS of claim 25, wherein the multicasting STID indicates an identifier of the group.

27. An access service network-gateway (ASN-GW) in a mobile communication system, the ASN-GW comprising:
- a reception unit configured to receive a mobile station (MS) attachment request (MS_Attachment_REQ) message from a base station (BS) providing a service to an MS;
- a control unit configured to receive a group profile for a group service from an authorization, authentication, and accounting (AAA) server, and store the group profile during an initial network entry procedure, and generate the group service flow for the MS when the MS_Attachment_REQ message includes a group service request indicator indicating that a group service flow for the MS is to be generated; and
- a transmission unit configured to transmit a path registration request (Path_REG_REQ) message including the group service flow information and the group service indicator for the generated group service flow to the BS.

28. An access service network-gateway (ASN-GW) in a mobile communication system, the ASN-GW comprising:
- a control unit configured to receive a group profile for a group service from an application server (AS), store the group profile, determine whether the group profile includes a service flow of a mobile station (MS), generate the group service flow for the MS when the group profile does not include the service flow of the MS, and change the service flow of the AMS to the group service flow when the group profile includes the service flow of the MS; and
- a transmission unit configured to transmit a path registration request (Path_REG_REQ) message including group service flow information and a group service indicator for the generated group service flow to a base station (BS) providing a service to the MS, and transmit a path modification request (Path_Modification_REQ) message, which includes the group service flow information and the group service indicator for the changed group service flow, to the BS.

* * * * *